United States Patent
Han et al.

(10) Patent No.: US 8,722,273 B2
(45) Date of Patent: May 13, 2014

(54) ULTRALOW LOADING FUEL CELL CATALYST

(75) Inventors: Taehee Han, Farmington Hills, MI (US); Ellazar V. Niangar, Farmington Hills, MI (US); Nilesh Dale, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/537,994

(22) Filed: Jun. 29, 2012

(65) Prior Publication Data
US 2014/0004440 A1    Jan. 2, 2014

(51) Int. Cl.
*H01M 8/10* (2006.01)
*B01J 35/10* (2006.01)

(52) U.S. Cl.
USPC .............. 429/465; 429/482; 502/300

(58) Field of Classification Search
USPC ........... 429/465, 482; 502/300, 339; 977/773, 977/810, 948
See application file for complete search history.

(56) References Cited

U.S. PATENT DOCUMENTS

| | | |
|---|---|---|
| 6,165,643 A | 12/2000 | Doyle et al. |
| 7,572,750 B2 | 8/2009 | Chen et al. |
| 7,871,955 B2 | 1/2011 | Cao et al. |
| 2005/0112451 A1 | 5/2005 | Lee et al. |
| 2009/0155163 A1 | 6/2009 | Kang et al. |
| 2010/0285397 A1 | 11/2010 | Lin et al. |
| 2011/0034325 A1 | 2/2011 | Catanorchi et al. |
| 2011/0034328 A1 | 2/2011 | Kang et al. |
| 2011/0159400 A1 | 6/2011 | Karulkar |
| 2011/0159403 A1 | 6/2011 | Karulkar |
| 2011/0260119 A1 | 10/2011 | Zelenay et al. |
| 2011/0287174 A1* | 11/2011 | Calabrese et al. ............. 427/115 |
| 2012/0028163 A1* | 2/2012 | McGrath et al. ............. 429/482 |
| 2012/0028169 A1 | 2/2012 | Roh et al. |

FOREIGN PATENT DOCUMENTS

| | | |
|---|---|---|
| JP | 2006253030 A | 9/2006 |
| JP | 2008077974 A | 4/2008 |
| JP | 2009117248 A | 5/2009 |

OTHER PUBLICATIONS

Shrestha, S., et al., "ORR and fuel cell performance of Pt supported on N-functional mesoporous carbon," ECST, 41 (1) 1183-1191 (2011).
Li, Xuguang, et al.; "Highly Stable Pt and PtPd hybrid catalysts supported on a nitrogen-modified carbon composite for fuel cell application", Journal of Power Sources 195 (2010), pp. 445-452.
Popov, Branko N., et al.; "Development of Ultra-Low Pt Alloy Cathode Catalyst for PEM Fuel Cells", ECS Transactions, 41 (1) (2011), pp. 955-969.
Popov, Branko N., et al.; "Development of Ultra-Low Pt Alloy Cathode Catalyst for PEM Fuel Cells", ECS Transactions, 50 (2) (2012), pp. 773-785.

* cited by examiner

*Primary Examiner* — Mark F Huff
*Assistant Examiner* — Monique Wills
(74) *Attorney, Agent, or Firm* — Young, Basile, Hanlon & MacFarlane, P.C.

(57) ABSTRACT

Disclosed herein are embodiments of ultralow loading catalyst. Also disclosed are membrane electrode assemblies and fuel cells utilizing the ultralow loading catalyst. One embodiment of an ultralow loading catalyst includes support particles comprised of a non-precious metal catalyst material and precious metal particles supported on the support particles.

20 Claims, 3 Drawing Sheets

US 8,722,273 B2

ULTRALOW LOADING FUEL CELL CATALYST

TECHNICAL FIELD

The disclosure herein relates in general to catalyst composed of more than one type of catalyst particle, and more particularly, to ultralow loading fuel cell catalyst including non-precious group metals catalyst and precious group metals particles.

BACKGROUND

Platinum and other precious metal-based catalysts have proven to provide superior performance to proton exchange membrane fuel cell technology. One of the major hurdles for mass-commercialization of proton exchange membrane fuel cell vehicles is their high cost. This is due, in particular, to the usage of platinum and other precious group metals as the electrocatalyst. Two potential strategies to reduce the cost are to either significantly lower the loading of platinum/precious group metals (PGM) or by using non-precious group metal (non-PGM) catalysts such as metal-nitrogen-carbon (MNC) type catalysts. So far, however, performance of non-PGM based electrocatalysts for the oxygen reduction reaction (ORR) in polymer electrolyte membrane fuel cells has been no match against the performance of PGM based catalysts, in part because they have a relatively low number of active sites per unit volume.

SUMMARY

Disclosed herein are embodiments of ultralow loading catalyst. One embodiment of an ultralow loading catalyst includes support particles comprised of a non-precious metal catalyst material and precious metal particles supported on the support particles.

Also disclosed are membrane electrode assemblies and fuel cells utilizing the ultralow loading catalyst disclosed herein.

These and other aspects of the present disclosure are disclosed in the following detailed description of the embodiments, the appended claims and the accompanying figures.

BRIEF DESCRIPTION OF THE DRAWINGS

The various features, advantages and other uses of the present apparatus will become more apparent by referring to the following detailed description and drawing in which.

DETAILED DESCRIPTION

Disclosed herein are ultralow loading catalysts that reduce catalyst material cost while maintaining performance. The ultralow loading catalysts can be used in various applications, including proton exchange membrane fuel cells for vehicles and stationary power, direct methanol fuel cells, and other similar applications.

Figure 1:
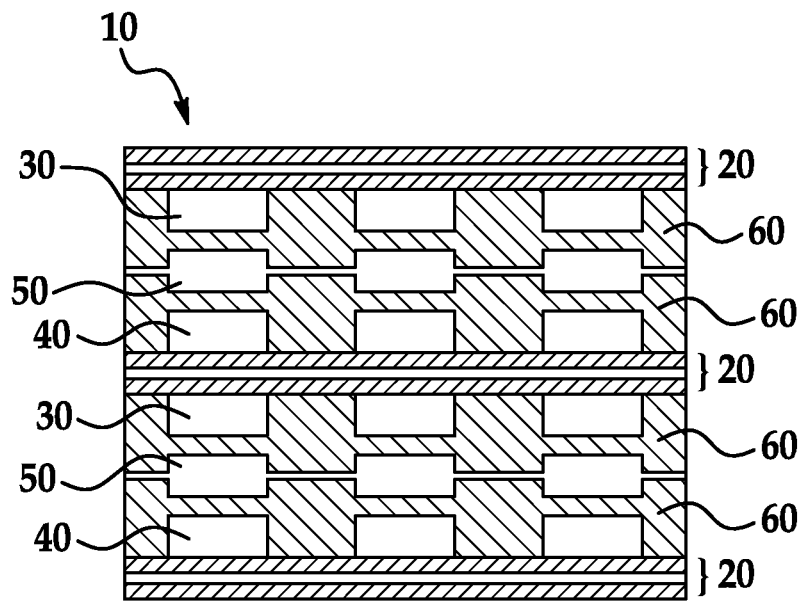
FIG. 1 is a schematic cross-sectional view of a fuel cell stack.

As a non-limiting example, the ultralow loading catalysts can be used in a proton exchange membrane fuel cell, which is an electrochemical device converting chemical energy to an electrical energy by using hydrogen as a fuel and oxygen/air as an oxidant. The proton exchange membrane fuel cell generally comprises five layers to form a fuel cell membrane electrode assembly, including a solid polymer electrolyte proton conducting membrane, two gas diffusion layers, and two catalyst layers. FIG. 1 shows a schematic cross-sectional illustration of a portion of a fuel cell stack 10. The illustration is provided as an example of the use of catalyst in fuel cells and is not meant to be limiting. The fuel cell stack 10 is comprised of multiple membrane electrode assemblies 20. Fuel 30 such as hydrogen is fed to the anode side of a membrane electrode assembly 20, while an oxidant 40 such as oxygen or air is fed to the cathode side of the membrane electrode assembly 20. Coolant 50 is supplied between the fuel 30 and oxidant 40, the coolant 50 separated from the fuel 30 and oxidant 40 by separators 60.

Figure 2:
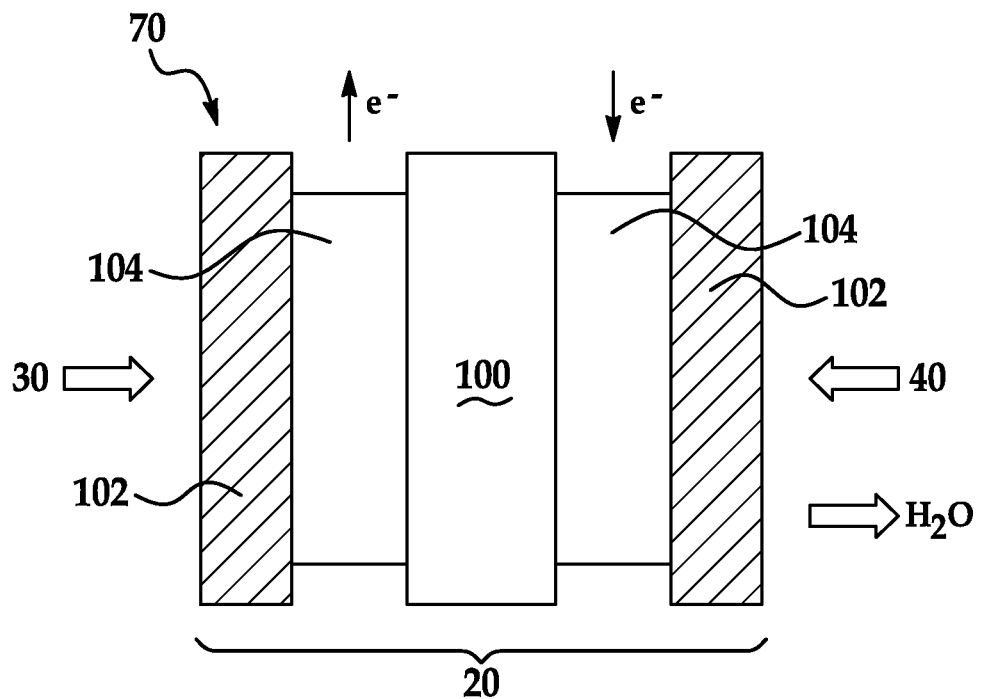
FIG. 2 is a schematic cross-sectional view of a membrane electrode assembly.

FIG. 2 is an illustration of one of the plurality of fuel cells 70 in the fuel cell stack 10. The fuel cell 70 is comprised of a single membrane electrode assembly 20. The membrane electrode assembly 20 has a catalyst coated membrane 100 with a gas diffusion layer 102 on opposing sides of the membrane 100. The membrane 100 has a catalyst layer 104 formed on opposing surfaces of the membrane 100, such that when assembled, the catalyst layers are each between the membrane 100 and a gas diffusion layer 102. Alternatively, a gas diffusion electrode is made by forming one catalyst layer 104 on a surface of two gas diffusion layers 102 and sandwiching the membrane 100 between the gas diffusion layers 102 such that the catalyst layers 104 contact the membrane 100. When fuel 30, such as hydrogen gas, is introduced into the fuel cell 70, the catalyst layer 104 of the catalyst coated membrane 100 splits hydrogen gas molecules into protons and electrons. The protons pass through the membrane 100 to react with the oxidant 40, such as air, forming water (H$_2$O). The electrons (e$^-$), which cannot pass through the membrane 100, must travel around it, thus creating the source of electrical energy.

To reduce the cost of fuel cells and to decrease environmental impact, much effort is being made to increase the performance and durability of catalysts such as those described with reference to FIGS. 1 and 2. Over the past years, membrane electrode assembly technology has improved significantly with the implementation of advanced materials for membranes 100, gas diffusion layers 102, and catalysts 104. With these improvements, improved performance and improved durability have been achieved.

Traditional precious metal group (PGM) catalysts for fuel cells use one or a combination of a precious metal such as platinum, gold and iridium, and/or transition metals such as cobalt and nickel. The catalysts can be in various forms, such as alloys, coreshells, nanowires and nanoparticles. Although performance and durability of membrane electrode assemblies have achieved great levels, high material cost, mainly due to the precious metal content in the catalyst, remains one of the barriers for mass commercialization.

One approach to reduce cost of the catalyst is to use non-precious group metal (non-PGM) catalysts. There are various non-PGM catalysts. Some non-PGM catalysts are generally composed of carbon, nitrogen and transition metal forming a framework to provide active sites. Non-PGM catalysts are somewhat effective due to the presence of metallic particles, conjugated carbon-nitrogen-oxide-metallic networks, and nitrogen-bonded carbon. However, non-PGM catalysts suffer from many drawbacks. Unlike PGM catalyst, catalytic or active sites for non-PGM are multi-atom entities rather than single atom sites. Due to the multi-atom active sites, non-PGM catalysts require a larger surface area to accommodate the same number of active centers as compared with PGM catalysts. Requiring a larger surface area directly affects packaging issues for vehicular applications. Other drawbacks with non-PGM catalysts are their lower stability and lower durability. While PGM catalysts are chemically stable under acidic environments at ~80° C., non-PGM catalysts exhibit low stability in acid, which is connected to leaching of metal from the carbon-nitrogen network. Non-PGM catalysts also exhibit low durability in acid and alkaline solutions, since production of excess hydrogen peroxide leads to corrosion of both metal and carbon-nitrogen networks, lowering the performance and weakening the stability of the membrane and the catalyst layer.

The ultralow loading catalysts disclosed herein comprise support particles of a non-PGM catalyst and PGM particles supported on the support particle. The non-PGM catalyst is used for the dual functions of support and active catalyst sites. By depositing a small amount of PGM particles on non-PGM catalyst support, the cost of the resulting catalyst is reduced while the catalytic activity or performance is increased. The catalytic activity is improved by the addition of single active sites provided by the PGM particles, providing more active sites for fuel cell oxygen reduction reaction while keeping increases in volume and price minimal.

Figure 3:
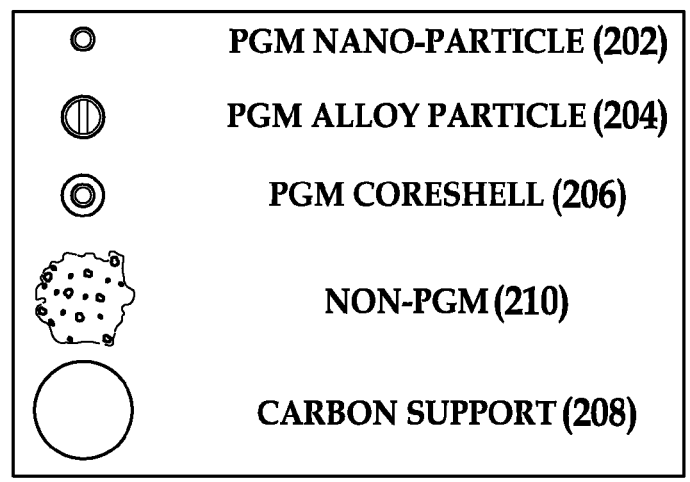
FIG. 3 is a schematic diagram of the synthesis of an ultralow loading catalyst as disclosed herein.
Figure 3:
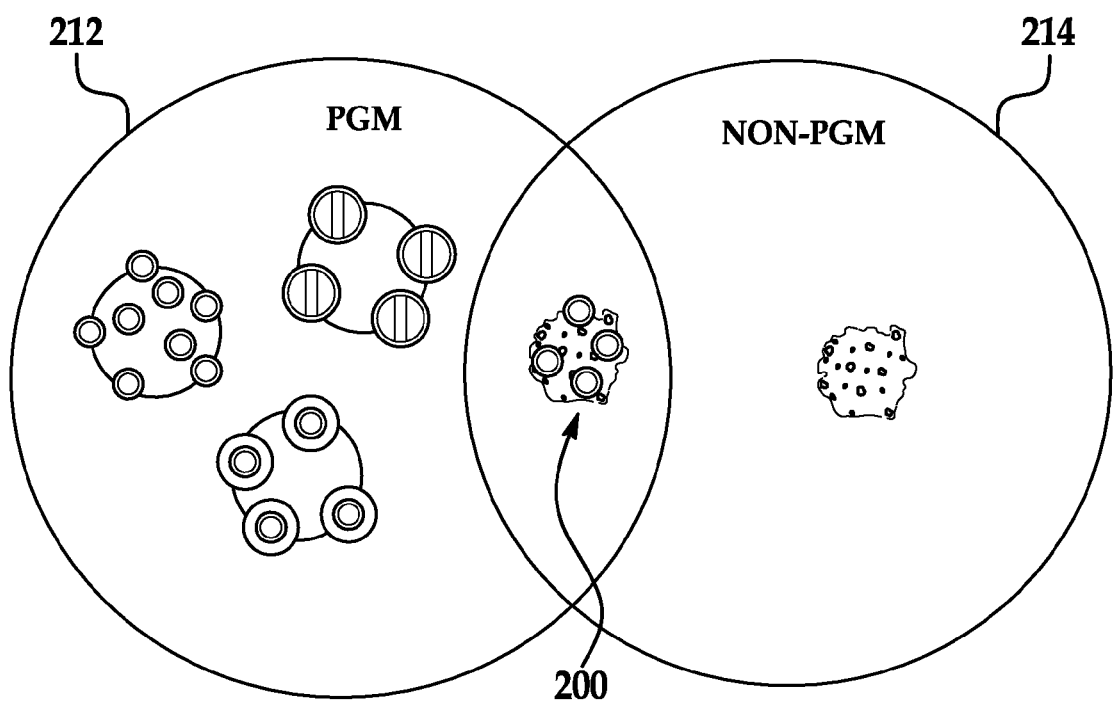

As depicted in FIG. 3, the ultralow loading catalyst 200 can be synthesized by depositing any form of PGM on any form of non-PGM catalyst, blending PGM as active catalyst and non-PGM catalyst as active catalyst and support, improving the oxygen reduction reaction while reducing the precious group metal loading. FIG. 3 provides non-limiting examples of PGM that can be used to prepare the ultralow loading catalysts 200, including PGM nano-particles 202, PGM alloy particles 204, and PGM coreshells 206. Non-limiting examples of PGM catalysts are shown in circle 212, created with PGM on carbon support 208. Non-PGM catalyst 210 is shown in circle 214. The ultralow loading catalyst 200 disclosed herein is a combination catalyst, incorporating PGM particles with non-PGM catalyst 210, as illustrated.

The ultralow loading catalyst shown in FIG. 3 is a combination of PGM nano-particles deposited on non-PGM catalysts. The PGM nano-particles have a diameter in the range of two to ten nanometers, or more particularly two to four nanometers. Although the smallest practicable nano-particles are desired, nano-particles of PGM less than 2 nanometers tend to be unstable with regard to agglomeration.

The ultralow loading catalyst 200 shown in FIG. 3 is a non-limiting example and other combinations of ultralow loading catalysts can include any PGM on active carbon, PGM and transition metals on non-PGM catalyst, PGM coreshell on non-PGM catalyst, PGM on metal oxide based supports, and other combinations known to those skilled in the art.

The non-PGM catalyst used as both catalyst and support can be synthesized by any means known to those skilled in the art. One example includes using various micro-pore controlled structured carbon types, such as Vulcan®, Ketjenblack®, Black Pearl™ and others, synthesized with nitrogen and transition metal precursors. Another example includes using raw carbon with no structured porosity or carbon precursors with nitrogen and transition metal precursors.

The ultralow loading catalyst disclosed herein is prepared so that the PGM particles are uniformly distributed on a surface of the non-PGM catalyst, such as ultralow loading catalyst 200 shown in FIG. 3. The ultralow loading catalyst disclosed herein has a PGM loading of less than fifteen weight percent. Various PGM weight percent loaded catalysts can be synthesized, with the minimum and maximum PGM loading dictated by the structure of the particles used to prepare the ultralow loading catalyst. However, ultralow loading catalyst disclosed herein has been synthesized with a PGM loading of less than five weight percent. The volumetric catalytic activity of the ultralow loading catalyst is more than five times the volumetric catalytic activity of the non-PGM catalyst alone that is used to synthesize the ultralow loading catalyst.

The ultralow loading catalyst disclosed herein is more stable and durable than the non-PGM catalyst used to synthesize the ultralow loading catalyst. As mentioned, non-PGM catalysts exhibit low stability and durability in acid and alkaline solutions, since production of excess hydrogen peroxide leads to corrosion of both metal and carbon-nitrogen networks, lowering the performance and weakening the stability of the membrane and the catalyst layer. However, the PGM particles in the ultralow loading catalyst can utilize the hydrogen peroxide generated from the non-PGM catalyst oxygen reduction reaction to perform its own oxygen reduction reaction. By using up at least some of the generated hydrogen peroxide, the hydrogen peroxide will not reach a detrimental quantity, thus protecting the membrane and catalyst from degradation.

Figure 4:
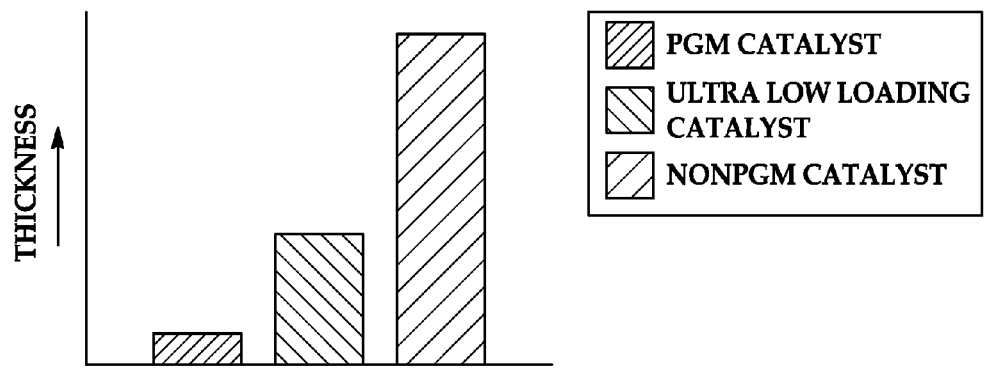
FIG. 4 is a graphic schematic comparing thicknesses of PGM catalyst, non-PGM catalyst and the ultralow loading catalyst as disclosed herein.

The optimum thickness of a catalyst layer 104 (especially on a cathode side) used in a membrane electrode assembly 20 as illustrated in FIG. 2 is between about five and fifteen microns. FIG. 4 is a schematic illustrating the thickness of a PGM catalyst traditionally used in the membrane electrode assembly 20. As shown, the non-PGM catalyst requires a much thicker layer to produce a comparable activity (still much lower, currently). The ultralow loading catalyst disclosed herein balances catalyst activity with thickness (or volume) of catalyst required to obtain the necessary fuel cell performance. The greater the PGM concentration used, the lower the volume and the thinner a layer of catalyst is required. However, as the PGM concentration increases, the cost increases, making the catalyst commercially impractical. For example, a membrane electrode assembly using an ultralow loading catalyst having five weight percent platinum may require a volume of ultralow loading catalyst that produces a catalyst layer having a thickness of fifteen microns to obtain the desired performance, while a membrane electrode assembly using an ultralow loading catalyst having fifteen weight percent platinum may require a volume of ultralow loading catalyst that produces a catalyst layer having a thickness of seven microns to produce the same performance. Because both thicknesses are acceptable, the ultralow loading catalyst producing the thicker layer but with lower platinum loading may be more commercially viable as it may be more economical.

An ultralow loading catalyst as disclosed herein having five weight percent platinum on a non-PGM catalyst is prepared as follows. 5.25 mg H2PtC16, a platinum precursor, was mixed with 47.5 mg non-PGM catalyst in 25 mL ethylene glycol. The mixture was sonicated for 30 minutes to form homogeneous slurry and subsequently heated in an industrial microwave oven equipped with a reflux condenser. The solution was heated at a controlled ramp rate of 10° C/min to a final temperature of 190° C. and was kept at 190° C. for 3 minutes. The hybrid catalyst was then allowed to cool to room temperature and subsequently washed five times with deionized water to remove chloride ions and other impurities.

Figure 5:
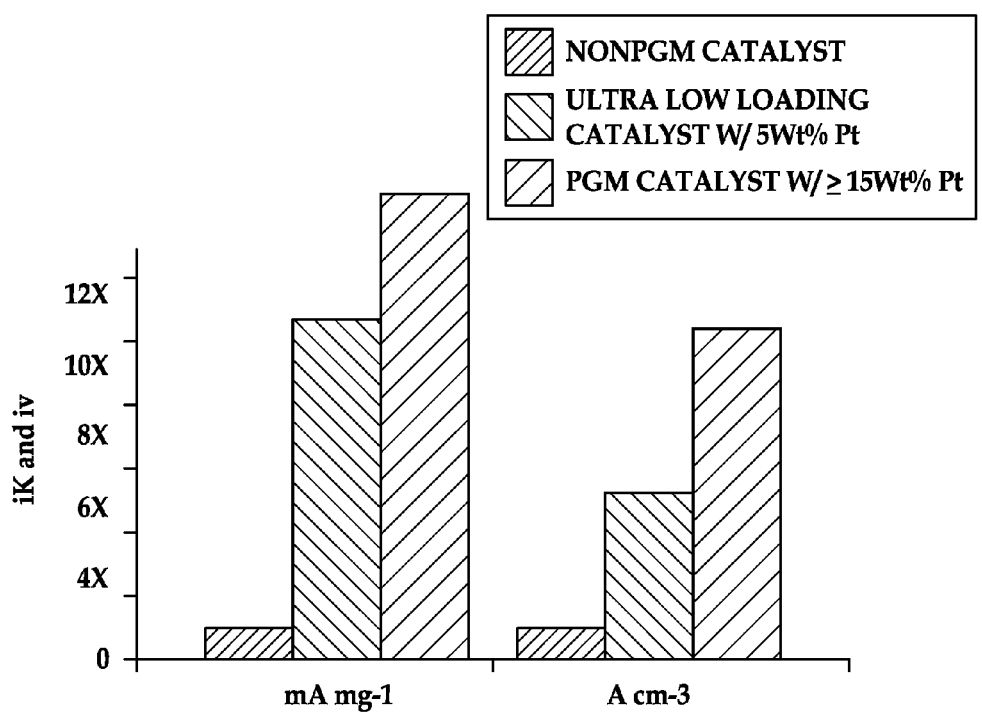
FIG. 5 is a graphic schematic comparing kinetic currents measured at 0.8V and normalized for loading (mA/mg) and volumetric activities (A/cm$^3$) of PGM catalyst, non-PGM catalyst and the ultralow loading catalyst as disclosed herein.

Two metrics, kinetic currents measured at 0.8V and normalized for loading (mA/mg) and volumetric activities (A/cm$^3$), are used to compare the activity of the ultralow loading catalyst with non-PGM catalyst alone. As shown in FIG. 5, the ultralow loading catalyst having a platinum presence on non-PGM catalyst support exhibits higher kinetic current and volumetric activity than a non-PGM catalyst.

The synthesis process provided herein is a non-limiting example. A directed microwave-bream or microwave laser can be employed to induce rapid, localized heating of the mixture rather than the industrial microwave oven. Ultralow loading catalysts can also be synthesized from other methods, including traditional heating using oil bath, sand bath, heating mantle and other heating devices as a heat source to carry out the reduction of metal precursors to metallic nanoparticles using a polyol such as ethylene glycol. Polyols other than ethylene glycol, such as diethylene glycol, propylene glycol, glycerol, and polyethylene glycol can be used as the solvent and reducing agent to carry out the reduction of metal precursors to metallic nanoparticles.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An ultralow loading catalyst comprising:
    a support particle comprised of a carbon-nitrogen-transition metal network having a first set of active sites; and
    precious metal particles supported on the support particle and having a second set of active sites, wherein the first set of active sites and the second set of active sites of the precious metal particles supported on the support particle in total have a volumetric catalytic activity more than five times the volumetric catalytic activity of the first set of active sites of the support particle alone.

2. The ultralow loading catalyst of claim 1, wherein the precious metal is platinum.

3. The ultralow loading catalyst of claim 2, wherein the amount of platinum in the catalyst is less than five weight percent.

4. The ultralow loading catalyst of claim 1, wherein the precious metal particles are nanoparticles having a diameter in a range of 2-10 nanometers and the support particle has a diameter equal to or greater than one micron.

5. The ultralow loading catalyst of claim 1, wherein the precious metal particles are uniformly distributed on a surface of the support particle.

6. The ultralow loading catalyst of claim 1, wherein the precious metal particles comprise precious metal alloy particles.

7. The ultralow loading catalyst of claim 1, wherein the precious metal particles comprise precious metal coreshell particles.

8. A membrane electrode assembly comprising:
    an ultralow loading catalyst having catalyst particles comprising:
        a support particle comprised of a carbon-nitrogen-transition metal network having a first set of active sites; and
        precious metal particles supported on the support particle having a second set of active sites, wherein the first and second active sites with the precious metal particles supported on the support particles in total have a volumetric catalytic activity more than five times the volumetric catalytic activity of the first volumetric catalytic activity of the support particle alone.

9. The membrane electrode assembly of claim 8, further comprising:
    a membrane layer; and
    an electrocatalyst layer formed from the ultralow loading catalyst having a thickness less than 15 microns and a precious metal loading of less than fifteen weight percent.

10. The membrane electrode assembly of claim 9, wherein the precious metal is platinum.

11. The membrane electrode assembly of claim 10, wherein the amount of platinum in the catalyst is less than five weight percent.

12. The membrane electrode assembly of claim 8, wherein the precious metal particles are nanoparticles having a diameter in a range of 2-10 nanometers and the support particle has a diameter of equal to or greater than one micron.

13. The membrane electrode assembly of claim 9, wherein the precious metal particles are uniformly distributed on a surface of the support particles.

14. The membrane electrode assembly of claim 9, wherein the precious metal particles comprise precious metal alloy particles.

15. The membrane electrode assembly of claim 9, wherein the precious metal particles comprise precious metal coreshell particles.

16. A fuel cell comprising a plurality of membrane electrode assemblies each comprising:
    an ultralow loading catalyst having catalyst particles comprising:
        a support particle comprised of a carbon-nitrogen-transition metal network having a first set of active sites; and
        precious metal particles supported on the support particle and having a second set of active sites, wherein the first set of active sites and the second set of active sites of the precious metal particles supported on the support particles in total have a volumetric catalytic activity more than five times the volumetric catalytic activity of the first set of active sites of the support particle alone.

17. An ultralow loading catalyst having catalyst particles comprising:
    a support particle comprised of a carbon-nitrogen-transition metal network having a diameter equal to or greater than one micron; and
    precious metal particles supported on the support particle having a diameter between 2 and 10 nanometers, wherein the support particle provides a first set of active sites having a first volumetric catalytic activity and the precious metal particles provide a second set of active sites, the first and second active sites of the precious metal particles supported on the support particle in total having more than five times the volumetric catalytic activity of the first volumetric catalytic activity of the support particle alone.

18. The ultralow loading catalyst of claim 17, wherein the precious metal is platinum.

19. The ultralow loading catalyst of claim 18, wherein the amount of platinum in the catalyst is less than five weight percent.

20. The ultralow loading catalyst of claim 17, wherein the precious metal particles are uniformly distributed on a surface of the support particle.

\* \* \* \* \*